United States Patent
McCullen (10) Patent No.: US 10,417,922 B2
(45) Date of Patent: Sep. 17, 2019

(54) SYSTEMS AND METHODS FOR INTEGRATING TERRAIN AND WEATHER AVOIDANCE FOR DETECTION AND AVOIDANCE

(71) Applicant: Aviation Communication & Surveillance Systems, LLC, Phoenix, AZ (US)

(72) Inventor: Robert John McCullen, Queen Creek, AZ (US)

(73) Assignee: AVIATION COMMUNICATION & SURVEILLANCE SYSTEMS LLC, Phoenix, AZ (US)

( * ) Notice: Subject to any disclaimer, the term of this patent is extended or adjusted under 35 U.S.C. 154(b) by 0 days.

(21) Appl. No.: 15/600,496

(22) Filed: May 19, 2017

(65) Prior Publication Data

US 2018/0018886 A1    Jan. 18, 2018

Related U.S. Application Data

(60) Provisional application No. 62/338,661, filed on May 19, 2016.

(51) Int. Cl.
| | |
|---|---|
| *G08G 5/04* | (2006.01) |
| *B64C 39/02* | (2006.01) |
| *B64D 45/00* | (2006.01) |
| *G08G 5/00* | (2006.01) |

(52) U.S. Cl.
CPC .......... *G08G 5/045* (2013.01); *B64C 39/024* (2013.01); *B64D 45/00* (2013.01); *G08G 5/0021* (2013.01); *G08G 5/0091* (2013.01); *B64C 2201/141* (2013.01); *B64C 2201/146* (2013.01)

(58) Field of Classification Search
USPC .......................................................... 701/14
See application file for complete search history.

(56) References Cited

U.S. PATENT DOCUMENTS

| | | | |
|---|---|---|---|
| 7,737,878 B2* | 6/2010 | van Tooren | G01S 13/9303 244/3.1 |
| 2005/0156777 A1* | 7/2005 | King | G01S 3/023 342/29 |
| 2010/0292871 A1* | 11/2010 | Schultz | G01C 21/00 701/3 |

* cited by examiner

*Primary Examiner* — Maceeh Anwari
(74) *Attorney, Agent, or Firm* — Dickinson Wright PLLC (57) ABSTRACT

Various systems may benefit from the appropriate interworking of subsystems. For example, various avionics systems and method may benefit from the integration of terrain and/or weather avoidance, for example with other detection and avoidance subsystems. A method can include determining, by an avionics system, a hazard condition with respect to an ownship aircraft. The method can also include generating, by the avionics system, a maneuver inhibition based on the determined hazard condition. The method can further include providing the maneuver inhibition to a traffic avoidance or alerting system.

19 Claims, 6 Drawing Sheets

SYSTEMS AND METHODS FOR INTEGRATING TERRAIN AND WEATHER AVOIDANCE FOR DETECTION AND AVOIDANCE

CROSS-REFERENCE TO RELATED APPLICATION

This application is related to and claims the benefit and priority of U.S. Provisional Patent Application No. 62/338,661 filed May 19, 2016, the entirety of which is hereby incorporated herein by reference.

BACKGROUND

Field:

Various systems may benefit from the appropriate interworking of subsystems. For example, various avionics systems and method may benefit from the integration of terrain and/or weather avoidance, for example with other detection and avoidance subsystems.

Description of the Related Art:

For many unmanned aircraft systems (UAS), a terrain and/or weather avoidance system may be useful for safe operation both while operating in Pilot "on the loop" and in Pilot "in the loop" control scenarios. Current Class A, Class B, or Class C Terrain Awareness Systems may not meet the functional needs of these unmanned aircraft.

SUMMARY

According to certain embodiments, a method can include determining, by an avionics system, a hazard condition with respect to an ownship aircraft. The method can also include generating, by the avionics system, a maneuver inhibition based on the determined hazard condition. The method can further include providing the maneuver inhibition to a traffic avoidance or alerting system.

In certain embodiments, a method can include receiving, by a traffic avoidance or alerting system, a maneuver inhibition from an avionics system. The method can also include determining, by the traffic avoidance or alerting system, a threat to an ownship aircraft from a target aircraft. The method can further include generating, by the traffic avoidance or alerting system, a maneuver for the ownship aircraft based on the determined threat and the received maneuver inhibition.

A method, according to certain embodiments, can include determining, by an integrated avionics system, a hazard condition with respect to an ownship aircraft. The method can also include generating, by the integrated avionics system, a maneuver inhibition based on the determined hazard condition. The method can further include determining, by the integrated avionics system, a threat to an ownship aircraft from a target aircraft. The method can additionally include generating, by the integrated avionics system, a maneuver for the ownship aircraft based on the determined threat and the received maneuver inhibition.

A system, in certain embodiments, can include at least one processor and at least one memory including computer program code. The at least one memory and the computer program code can be configured to, with the at least one processor, cause the system at least to determine, by an avionics system, a hazard condition with respect to an ownship aircraft. The at least one memory and the computer program code can also be configured to, with the at least one processor, cause the system at least to generate, by the avionics system, a maneuver inhibition based on the determined hazard condition. The at least one memory and the computer program code can further be configured to, with the at least one processor, cause the system at least to provide the maneuver inhibition to a traffic avoidance or alerting system.

According to certain embodiments, a system can include at least one processor and at least one memory including computer program code. The at least one memory and the computer program code can be configured to, with the at least one processor, cause the system at least to receive, by a traffic avoidance or alerting system, a maneuver inhibition from an avionics system. The at least one memory and the computer program code can also be configured to, with the at least one processor, cause the system at least to determine, by the traffic avoidance or alerting system, a threat to an ownship aircraft from a target aircraft. The at least one memory and the computer program code can further be configured to, with the at least one processor, cause the system at least to generate, by the traffic avoidance or alerting system, a maneuver for the ownship aircraft based on the determined threat and the received maneuver inhibition.

In certain embodiments, a system can include at least one processor and at least one memory including computer program code. The at least one memory and the computer program code can be configured to, with the at least one processor, cause the system at least to determine, by an integrated avionics system, a hazard condition with respect to an ownship aircraft. The at least one memory and the computer program code can also be configured to, with the at least one processor, cause the system at least to generate, by the integrated avionics system, a maneuver inhibition based on the determined hazard condition. The at least one memory and the computer program code can further be configured to, with the at least one processor, cause the system at least to determine, by the integrated avionics system, a threat to an ownship aircraft from a target aircraft. The at least one memory and the computer program code can additionally be configured to, with the at least one processor, cause the system at least to generate, by the integrated avionics system, a maneuver for the ownship aircraft based on the determined threat and the received maneuver inhibition.

BRIEF DESCRIPTION OF THE DRAWINGS

For proper understanding of the invention, reference should be made to the accompanying drawings, wherein.

DETAILED DESCRIPTION

According to certain embodiments of the present invention, a mechanism may be employed to ensure that at a minimum the detect and avoid systems on board aircraft, such as unmanned aircraft, do not direct the aircraft into terrain. Additionally, certain embodiments of the present invention may provide ways to avoid weather during self-separation maneuvers. Thus, for example, certain embodiments of the present invention may help ensure safe and efficient flights.

Collision avoidance algorithms for many UAS vehicles may be based on an airborne collision avoidance system Xu (ACAS-Xu). This ACAS-Xu system may use own aircraft position and the relative position of an intruder to determine an appropriate maneuver, which may be vertical, horizontal, or a combination thereof. This data may be used by the system to ensure that ownship remains at a safe distance away, as well as to ensure that "Well Clear" separation is maintained and that potential collisions are avoided. Certain embodiments of the present invention may provide a mechanism to ensure that ACAS-Xu does not inadvertently direct the aircraft or pilot into terrain or weather while computing the best course relative to a threat aircraft.

The ACAS Xu infrastructure may use "Climb Inhibits" and "Turn Inhibits" to limit possible response scenarios by ACAS Xu based on an aircraft performance limitation. In certain embodiments of the present invention, these and other inhibits may be utilized as a method to avoid both terrain and weather while computing appropriate maneuvers to remain well clear and avoid collisions. For terrain avoidance, a terrain database may be used to identify terrain and issue inhibits, such as turn inhibits, descend inhibits, climb inhibits, or combinations thereof, based on relative proximity to the terrain. For weather avoidance, any knowledge of weather (for example, flight information service-broadcast (FIS-B), weather radar, or any other desired weather input) can be used to issue inhibits due to weather.

Figure 1:
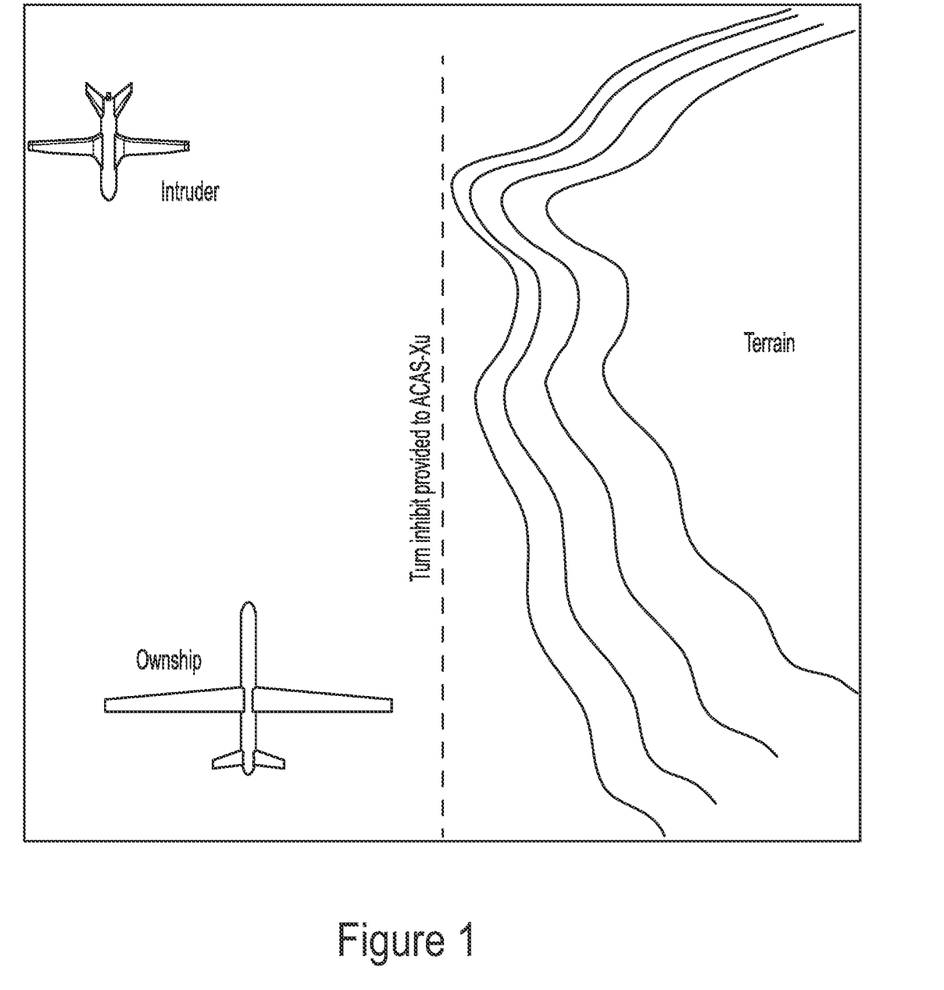
FIG. 1 illustrates a terrain-based turn right inhibit, according to certain embodiments of the present invention.

FIG. 1 illustrates a terrain-based turn right inhibit, according to certain embodiments of the present invention. More particularly, FIG. 1 shows a high level example of a scenario where Terrain to the right of ownship may generate a 'Turn Right' inhibit to ACAS-Xu. The ACAS-Xu algorithm may then know that turning right is not an option and may respond accordingly.

Figure 2:
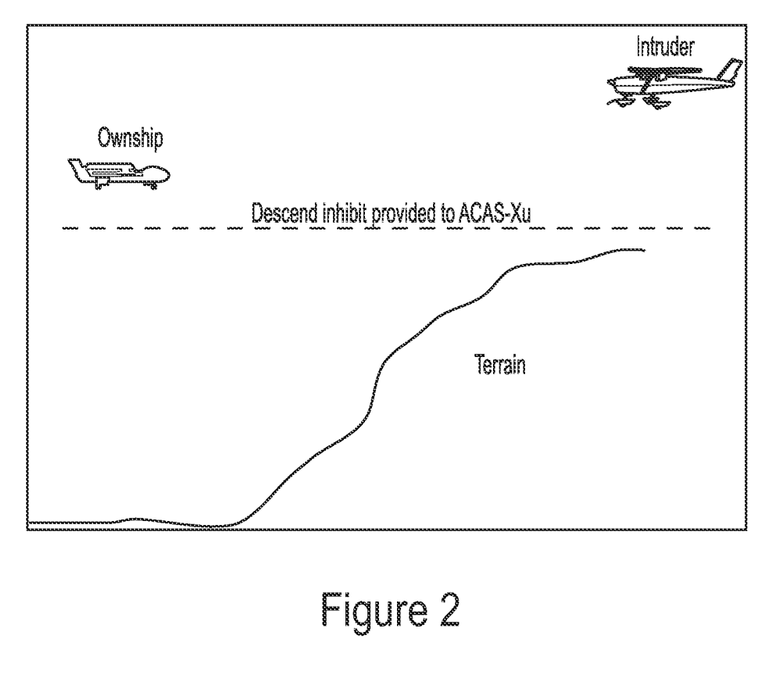
FIG. 2 illustrates a terrain-based descend inhibit, according to certain embodiments of the present invention.

FIG. 2 illustrates a terrain-based descend inhibit, according to certain embodiments of the present invention. More particularly, FIG. 2 shows a high level example of a scenario where Terrain below ownship may generate a 'Descend' inhibit to ACAS-Xu. The ACAS-Xu algorithm may then know that descending is not an option and may respond accordingly.

Figure 3:
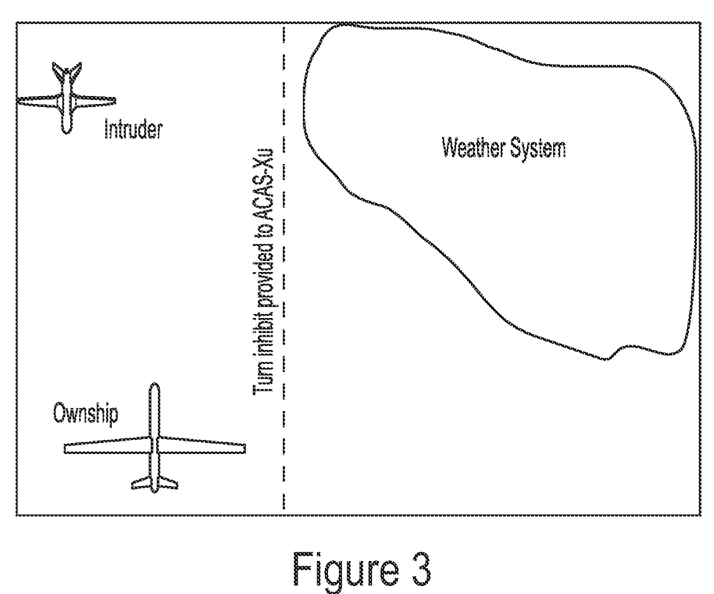
FIG. 3 illustrates a weather-based turn right inhibit, according to certain embodiments of the present invention.

FIG. 3 illustrates a weather-based turn right inhibit, according to certain embodiments of the present invention. Inhibits due to weather systems may be dealt with in the same or a similar way as regards terrain, by introducing "Inhibits" into an ACAS-Xu algorithm. More particularly, FIG. 3 shows an example where a weather system may generate a "Turn Right Inhibit" to ACAS-Xu.

Figure 4:
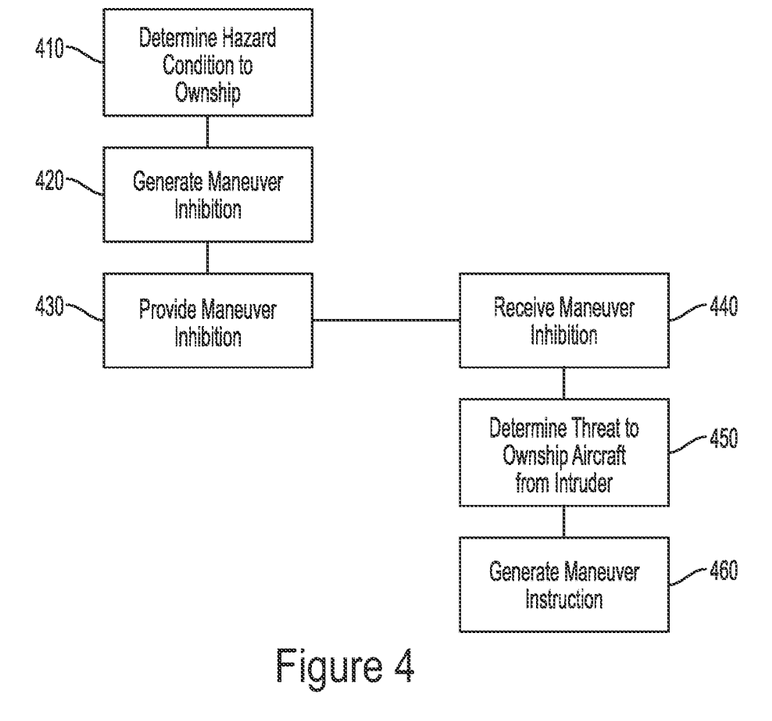
FIG. 4 illustrates a method according to certain embodiments of the present invention.

FIG. 4 illustrates a method according to certain embodiments of the present invention. As shown in FIG. 4, a method can include, at 410, determining, by an avionics system, a hazard condition with respect to an ownship aircraft. The avionics system can be a terrain avoidance system, a weather avoidance system, or a combination thereof. Other avionics systems are also permitted. The ownship aircraft can be an unmanned aircraft system and can be in a pilot on the loop or a pilot in the loop control scheme.

The method can also include, at 420, generating, by the avionics system, a maneuver inhibition based on the determined hazard condition. The maneuver inhibition can include a turn inhibit, a climb inhibit, a descend inhibit, or a combination thereof. The maneuver inhibition can be one of an absolute inhibition or a weighted inhibition.

The method can further include, at 430, providing the maneuver inhibition to a traffic avoidance or alerting system. The method can additionally include, at 440, receiving, by the traffic avoidance or alerting system, a maneuver inhibition from an avionics system. The traffic avoidance or alerting system may be an ACAS-Xu system.

The method can also include, at 450, determining, by the traffic avoidance or alerting system, a threat to an ownship aircraft from a target aircraft. This target aircraft may also be referred to as an intruder aircraft. The traffic avoidance or alerting system can be configured to take into account an own aircraft position and a relative or absolute position of the target aircraft. As mentioned above, the maneuver inhibition can be one of an absolute inhibition or a weighted inhibition. If a weighted inhibition is used, the system may weigh the inhibition against, for example, entering a weather system, with a limitation on approaching one or more target aircraft in the vicinity.

The determining the threat to the ownship aircraft can include determining threats from a plurality of target aircraft. The ownship aircraft can be configured to locate and track a position and speed of the target aircraft. The ownship aircraft may do this internally or may receive the tracking information from an external source such as ground-based air traffic control system. Optionally, the ownship aircraft may rely on primary radar reflections to detect the position and speed of the target aircraft. Alternatively, or in addition, the ownship aircraft may rely on second radar transmission, such as automatic dependent surveillance-broadcast (ADS-B) message, to detect the position and speed of the target aircraft.

The method can further include, at 460, generating, by the traffic avoidance or alerting system, a maneuver for the ownship aircraft based on the determined threat and the received maneuver inhibition. The maneuver can be a vertical maneuver, a horizontal maneuver, or a combination thereof. Optionally, the maneuver may also include a throttle increase or decrease maneuver, to manipulate the speed of the ownship aircraft.

Figure 5:
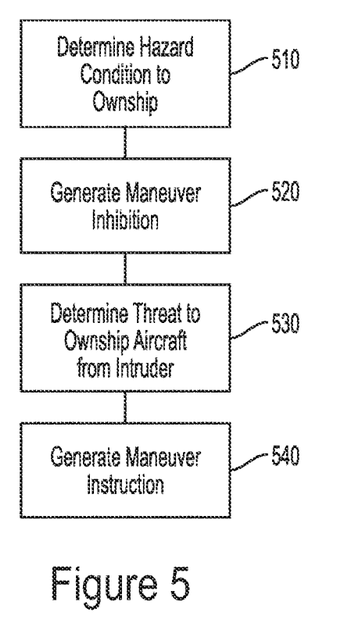
FIG. 5 illustrates a further method according to certain embodiments of the present invention.

FIG. 5 illustrates a further method according to certain embodiments of the present invention. As shown in FIG. 5, a method can be performed by an integrated avionics system, similarly to the less integrated approach described with reference to FIG. 4. The method can include, at 510, determining, by an integrated avionics system, a hazard condition with respect to an ownship aircraft. The method can also include, at 520, generating, by the integrated avionics system, a maneuver inhibition based on the determined hazard condition. The method can further include, at 530, determining, by the integrated avionics system, a threat to an ownship aircraft from a target aircraft. The method can additionally include, at 540, generating, by the integrated avionics system, a maneuver for the ownship aircraft based on the determined threat and the received maneuver inhibition.

The integrated avionics system can include a first system and a second system. A first system can be a terrain avoidance system and/or a weather avoidance system. The second system can be a traffic avoidance system or traffic alerting system.

Figure 6:
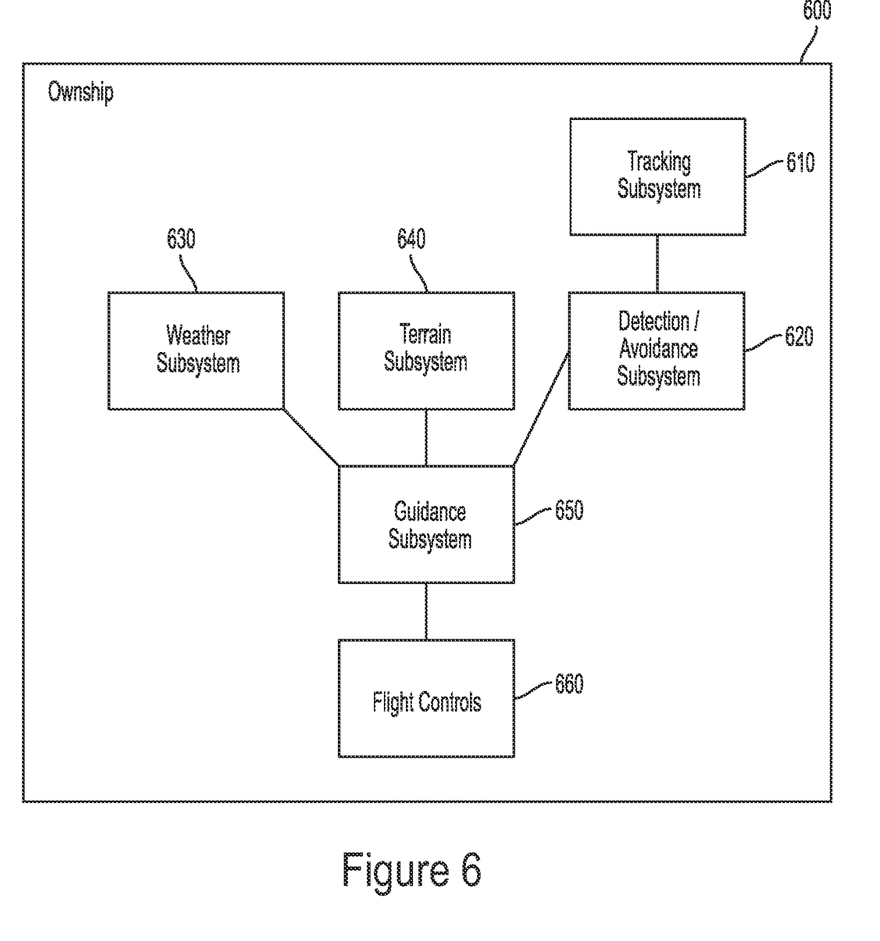
FIG. 6 illustrates an aircraft according to certain embodiments of the present invention.

FIG. 6 illustrates an aircraft according to certain embodiments of the present invention. The aircraft of FIG. 6 is shown as ownship 600. Ownship 600 may be configured to perform the methods of, for example, FIG. 4 and/or FIG. 5.

Ownship 600 may include a system, involving multiple subsystems. These subsystems are shown separate and may be implemented separately, but also may be implemented as a single integrated device.

The system can include a tracking subsystem 610. This subsystem may be linked to the aircraft's antennas and transponders. This subsystem may provide data regarding other aviation in the area, such as the target or intruder aircraft mentioned above.

The system can also include a detection/avoidance subsystem 620. This subsystem may be configured to determine that a threat exists, based on the information form the tracking subsystem 610. This threat may be the threat of a collision, an incursion, a wake risk, or any other undesired condition.

The system can further include a weather subsystem 630. The weather subsystem 630 may be attached to weather sensors, or alternatively may receive weather information from external sources, such as via FIS-B, as mentioned above. The weather subsystem 630 may generate a maneuver inhibition based on weather information.

The system can additionally include a terrain subsystem 640. The terrain subsystem 640 may be attached to a radar system that is used to detect ground proximity. Alternatively, or in addition, the terrain subsystem 640 may rely on global positioning system (GPS) data, an elevation map, and/or a barometer to determine ground proximity. The terrain subsystem 640 may generate a maneuver inhibition based on terrain information.

The system can also include a guidance subsystem 650. This subsystem is shown separate from the detection/avoidance subsystem 620, but optionally be integrated therewith. The guidance subsystem 650 may receive the threat information and maneuver inhibition information from each of the detection/avoidance subsystem 620, the weather subsystem 630, and terrain subsystem 640 subsystem.

The guidance subsystem 650 may take into account the threat information and maneuver inhibition information and may generate guidance information, such as an instruction to increase speed, decrease speed, ascend, descend, turn, or any combination thereof. The guidance information may be provided to flight controls 660, to control, for example, flight surfaces of the aircraft.

Each of these subsystems may be implemented using computer hardware and, optionally, computer software. The computer hardware may include at least one processor and at least one memory. The at least one memory can include computer programming code. Moreover, each of the subsystems may include one or more interfaces to the other subsystems. The subsystems may be connected in a linear order, as shown, but also or alternatively may be connected with a data bus or similar network architecture.

One having ordinary skill in the art will readily understand that the invention as discussed above may be practiced with steps in a different order, and/or with hardware elements in configurations which are different than those which are disclosed. For example, although an unmanned vehicle is used as an example, similar improvements may be provided with respect to a manned vehicle. Therefore, although the invention has been described based upon these preferred embodiments, it would be apparent to those of skill in the art that certain modifications, variations, and alternative constructions would be apparent, while remaining within the spirit and scope of the invention.

I claim:

1. A method, comprising:
   determining, by an avionics system, a hazard condition with respect to an ownship aircraft;
   generating, by the avionics system, a maneuver inhibition for the ownship aircraft based on the determined hazard condition; and
   providing the maneuver inhibition to a traffic avoidance or alerting system of the ownship aircraft, wherein the maneuver inhibition limits possible responses by the traffic avoidance or alerting system to a threat detected by the traffic avoidance or alerting system.

2. The method of claim 1, wherein the avionics system comprises a terrain avoidance system or a weather avoidance system.

3. The method of claim 1, wherein the ownship aircraft comprises an unmanned aircraft system.

4. The method of claim 1, wherein the ownship aircraft is operating in a pilot on the loop or a pilot in the loop control scheme.

5. The method of claim 1, wherein the maneuver inhibition comprises a turn inhibit, a climb inhibit, a descend inhibit, or a combination thereof.

6. The method of claim 1, wherein the maneuver inhibition comprises one of an absolute inhibition or a weighted inhibition.

7. The method of claim 1, wherein the ownship aircraft is configured to locate and track a position and speed of the target aircraft.

8. A method, comprising:
   receiving, by a traffic avoidance or alerting system of an ownship aircraft, a maneuver inhibition from an avionics system of the ownship aircraft;
   determining, by the traffic avoidance or alerting system, a threat to the ownship aircraft from a target aircraft; and
   generating, by the traffic avoidance or alerting system, a maneuver for the ownship aircraft based on the determined threat and the received maneuver inhibition, wherein the maneuver inhibition limits possible responses by the traffic avoidance or alerting system to a threat detected by the traffic avoidance or alerting system.

9. The method of claim 8, wherein the traffic avoidance or alerting system is configured to take into account an own aircraft position and a relative or absolute position of the target aircraft.

10. The method of claim 8, wherein the maneuver comprises a vertical maneuver, a horizontal maneuver, or a combination thereof.

11. The method of claim 8, wherein the maneuver inhibition comprises one of an absolute inhibition or a weighted inhibition.

12. The method of claim 8, wherein the determining the threat to the ownship aircraft comprises determining threats from a plurality of target aircraft.

13. A method, comprising:
   determining, by an integrated avionics system of an ownship aircraft, a hazard condition with respect to the ownship aircraft;
   generating, by the integrated avionics system, a maneuver inhibition based on the determined hazard condition;
   determining, by the integrated avionics system, a threat to an ownship aircraft from a target aircraft; and
   generating, by the integrated avionics system, a maneuver for the ownship aircraft based on the determined threat and the received maneuver inhibition, wherein the maneuver inhibition limits possible responses generated by the integrated avionics system to the threat.

14. The method of claim 13, wherein the integrated avionics system comprises a first system comprising a terrain avoidance system or a weather avoidance system and a second system comprising a traffic avoidance system or traffic alerting system.

15. A system, comprising:
at least one processor; and
at least one memory including computer program code,
wherein the at least one memory and the computer program code are configured to, with the at least one processor, cause the system at least to
determine, by an avionics system, a hazard condition with respect to an ownship aircraft;
generate, by the avionics system, a maneuver inhibition for the ownship aircraft based on the determined hazard condition; and
provide the maneuver inhibition to a traffic avoidance or alerting system of the ownship aircraft, wherein the maneuver inhibition is configured to limit possible responses by the traffic avoidance or alerting system to a condition detected by the traffic avoidance or alerting system.

16. A system, comprising:
at least one processor; and
at least one memory including computer program code,
wherein the at least one memory and the computer program code are configured to, with the at least one processor, cause the system at least to
receive, by a traffic avoidance or alerting system of an ownship aircraft, a maneuver inhibition from an avionics system of the ownship aircraft;
determine, by the traffic avoidance or alerting system, a threat to the ownship aircraft from a target aircraft; and
generate, by the traffic avoidance or alerting system, a maneuver for the ownship aircraft based on the determined threat and the received maneuver inhibition, wherein the maneuver inhibition is configured to limit possible responses generated by the integrated avionics system to the threat.

17. A system, comprising:
at least one processor; and
at least one memory including computer program code,
wherein the at least one memory and the computer program code are configured to, with the at least one processor, cause the system at least to
determine, by an integrated avionics system, a hazard condition with respect to an ownship aircraft;
generate, by the integrated avionics system, a maneuver inhibition for the ownship aircraft based on the determined hazard condition;
determine, by the integrated avionics system, a threat to the ownship aircraft from a target aircraft; and
generate, by the integrated avionics system, a maneuver for the ownship aircraft based on the determined threat and the received maneuver inhibition, wherein the maneuver inhibition is configured to limit possible responses generated by the integrated avionics system to the threat.

18. The system of claim 17, further comprising:
a weather sensor or receiver configured to receive flight information system-broadcast, wherein the determination of the hazard condition is based on input from the weather sensor or receiver.

19. The system of claim 17, further comprising:
a terrain awareness and warning system or a ground proximity warning system, wherein the determination of the hazard condition is based on input from the terrain awareness and warning system or the ground proximity warning system.

* * * * *